US009655017B2

(12) United States Patent
Grech

(10) Patent No.: US 9,655,017 B2
(45) Date of Patent: May 16, 2017

(54) HANDOVER IN COMMUNICATION NETWORKS

(75) Inventor: Sandro Grech, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 778 days.

(21) Appl. No.: 11/710,554

(22) Filed: Feb. 26, 2007

(65) Prior Publication Data

US 2007/0218903 A1    Sep. 20, 2007

Related U.S. Application Data

(60) Provisional application No. 60/776,958, filed on Feb. 28, 2006.

(51) Int. Cl.
*H04W 36/02* (2009.01)
*H04W 36/18* (2009.01)
*H04W 36/00* (2009.01)
*H04W 36/14* (2009.01)

(52) U.S. Cl.
CPC ........ *H04W 36/02* (2013.01); *H04W 36/0055* (2013.01); *H04W 36/14* (2013.01); *H04W 36/18* (2013.01)

(58) Field of Classification Search
CPC ............ H04W 36/0011; H04W 36/10; H04W 36/0005; H04W 36/0016; H04W 36/0022; H04W 36/0033; H04W 36/026; H04W 36/08; H04W 36/18; H04W 36/30; H04W 36/0027; H04W 36/14; H04W 36/34
USPC ..... 455/422.1, 436, 442, 439; 370/231, 255, 370/290, 331
See application file for complete search history.

(56) References Cited

U.S. PATENT DOCUMENTS

| | | | |
|---|---|---|---|
| 5,648,962 A | 7/1997 | Pirinen | |
| 6,577,606 B1 * | 6/2003 | Lee et al. | 370/290 |
| 2005/0286469 A1 | 12/2005 | Yang et al. | |
| 2006/0291455 A1 * | 12/2006 | Katz | H04L 29/06 370/355 |
| 2007/0021120 A1 * | 1/2007 | Flore | H04W 36/0066 455/436 |
| 2007/0053359 A1 * | 3/2007 | Wu et al. | 370/392 |
| 2007/0081494 A1 * | 4/2007 | Petrescu et al. | 370/331 |
| 2007/0286097 A1 * | 12/2007 | Davies | 370/255 |

(Continued)

FOREIGN PATENT DOCUMENTS

WO     WO 01/31963 A1    5/2001

OTHER PUBLICATIONS

U.S. Appl. No. 60/701,240, Provisional to 2007/0021120 to Flores et al, dated Jul. 15, 2005, Appendix A (pp. 1-15) and specification (pp. 1-3).*

(Continued)

*Primary Examiner* — Inder Mehra
(74) *Attorney, Agent, or Firm* — Mintz Levin Cohn Ferris Glovsky and Popeo, P.C.

(57) ABSTRACT

A node for a communication system that is configured to communicate with a mobile node via a first connection and to communicate with a third node via a first forwarding path is disclosed. After a procedure for handover of the first connection to a second connection between the mobile node and a target network node is initiated, data is communicated from the node to the third node for transmission to the target network node via a second forwarding path. The third node is configured to receive the data and to forward it to the target network node.

26 Claims, 4 Drawing Sheets

(56) References Cited

U.S. PATENT DOCUMENTS

| | | | |
|---|---|---|---|
| 2008/0214177 A1* | 9/2008 | Sehedic et al. | 455/422.1 |
| 2008/0287131 A1* | 11/2008 | Ju et al. | 455/439 |
| 2009/0185485 A1* | 7/2009 | Swami | 370/231 |
| 2009/0190549 A1* | 7/2009 | Kim et al. | 370/331 |

OTHER PUBLICATIONS

3GPP TR 23.882 v0.10.0; "3rd Generation Partnership Project; Technical Specification Group Services & System Aspects; 3GPP System Architecture Evolution: Report on Technical Options & Conclusions (Release 7)"; pp. 1-82; Jan. 2006. XP-002436761.
International Search Report, PCT/IB2007/000480 filed Feb. 21, 2007.
3GPP TS 43.129 v6.6.0—Global System for Mobile Communications, "$3^{rd}$ Generation Partnership Project; Technical Specification Group GERAN; Packet-switched handover for GERAN A/Gb mode; Stage 2", Jan. 2006, pp. 1-70.
3GPP TR 23.882 v0.8.1—Global System for Mobile Communications, "$3^{rd}$ Generation Partnership Project; Technical Specification Group Services and System Aspects; 3GPP System Architecture Evolution: Report on Technical Options and Conclusions", Nov. 2005, pp. 1-65.
English translation of an Office Action dated Dec. 12, 2009, issued by the Patent Office of the Russian Federation, issued in connection with related Russian patent application No. 2008138057/09.
3GPP TR 23.882 V0.10.0 (Jan. 2006), Technical Specification Group Service and System Aspects; 3GPP System Architecture Evolution: Report on Technical Options and Conclusions (Release 7); 3rd Generation Partnership Project.

* cited by examiner

HANDOVER IN COMMUNICATION NETWORKS

CROSS-REFERENCE TO RELATED APPLICATIONS

This application claims priority of U.S. Provisional Patent Application Ser. No. 60/776,958 filed on Feb. 28, 2006. The subject matter of this earlier filed application is hereby incorporated by reference.

FIELD OF THE INVENTION

The present invention relates to a communication system, and in particular, but not exclusively, to handover of a mobile node from a node to another node.

BACKGROUND

Communication networks typically operate in accordance with a given standard or specification which sets out what the various elements of the network are permitted to do and how that should be achieved. For example, the standard may define whether the user or more precisely, user equipment is provided with a circuit switched service or a packet switched service or both. The standard may also define the communication protocols which shall be used for the connection. The given standard also defines one or more of the required connection parameters. The connection parameters may relate to various features of the connection. The parameters may define features such as the maximum number of traffic channels, quality of service and so on and/or features that relate to multislot transmission.

In other words, the standard defines the "rules" and parameters on which the communication within the communication system can be based. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or CDMA in UMTS (Code Division Multiple Access in Universal Mobile Telecommunications System) and so on.

The user equipment i.e. a terminal that is to be used for communication over a particular communication network has to be implemented in accordance with the predefined "rules" of the network. A terminal may also be arranged to be compatible with more than one standard or specification, i. e. the terminal may communicate in accordance with several different types of communication services. These user equipment are often called multi-mode terminals, the basic example thereof being a dual-mode mobile station.

An example of a communication network is a cellular radio network consisting of access areas provided by cells. In most cases the cell can be defined as a certain access area covered by one or several base transceiver stations (BTS) serving user equipment (UE), such as mobile stations (MS), via a radio interface and possibly connected to a base station subsystem (BSS). Several cells cover a larger area, and form typically a radio coverage area referred to as a location area (LA) or in some standards as a routing area (RA). It should be appreciated that the size of the location area or routing area depends on the system and circumstances, and may equal to one cell or be even smaller, such a part of a coverage area of a base station. A feature of access systems such as those provided by the cellular system is that it provides mobility for the mobile stations, i.e. the mobile stations are enabled to move from a location area to another. A mobile station may move even from a network to another network that is compatible with the standard the mobile station is adapted to.

The user equipment (UE) within one of the cells of the cellular system can be controlled by a node providing controller function. Examples of the controller nodes include a base station controller (BSC) and a radio network controller (RNC). In UMTS the radio access network thereof is controlled by a radio network controller (RNC). The controller may control a number of base stations or a base station. The controller can be connected further to a gateway or linking node, for example a gateway GPRS support node (GGSN) or gateway mobile switching center (GMSC), linking the controller nodes to other parts of the communication system and/or to other communication networks, such as to a PSTN (Public Switched Telecommunications Network) or to a data network, such as to a X. 25 based network or to a TCP/IP (Transmission Control Protocol/Internet Protocol) based network. The network may also include nodes for storing information of mobile stations subscribing the networks or visiting the networks, such as appropriate home location registers (HLR) and visitor location registers (VLR).

When a user equipment communicates with a communication network, a communication path has been established between the user equipment and an element or node of the network. The network node is typically one of the controller nodes. At least a part of the communication between the user equipment and the actual destination node will then pass through the controller node. It is possible to transfer i.e. to handover the connection from a first node to a second node. This shall also be possible between two nodes that belong to different network systems. For example, a user equipment having a packet switched (PS) connection with a packet switched network system (e. g. the UMTS) may be handed over to have a circuit switched (CS) connection with a circuit switched network system (e. g. the GSM) and vice versa. The handover of the connection may be required e. g. when the mobile station moves i.e. roams from a cell to another cell. In case the new cell is not served by the same system as the previous cell, the handover needs to be accomplished between different communication systems.

A communication system needs to be able to provide various different functions in order be able to operate. These functions can be divided in different categories. A category comprises functions that relate to the actual carrying of the communication such as voice or multimedia or other data content in the system. Another category can be seen as being formed by control or management functions such as the control of various services and the actual communication. Signaling of messages associated with different functions is thus understood as being implemented on different planes. For example, control messages are communicated on a control plane and the actual communication is then transported on a user plane. The communication on the user plane is supported the signaling of the control messages on the control plane.

Typically the communication systems provide this by means of separate channels, e.g. by means of separated signaling and communication channels. Such arrangements are employed e.g. by signaling system 7 (SS7) core networks and Q.931/GSM/WCDMA subscriber access. Therefore the term "Signaling channel" may be used when referring to control plane communications. Similarly the term communication channel may be used when referring to user plane communications.

The various functions of the communication systems may have been developed quite independently from each other and may use different protocols in different communication systems. The standards and protocols define e.g. which plane shall be used for a certain purpose.

For example, in a third generation (3G) UMTS based communication system, various nodes including a base station, a radio network controller and a serving GPRS support node (SGSN), may be involved in providing user plane communications to a mobile station. A packet-switched intersystem handover from a source network (e.g. a second generation i.e. 2G network) to a target network (e.g. a 3G network) may be performed as defined in Third Generation Partnership Project (3GPP) technical specification TS 43.129, version 6.6.0 (2006-1). This handover scheme assumes the use of SGSN user plane connections in both the source and target network. Thus according to 3GPP TS 43.129, version 6.6.0 protocol data units (PDUs) queued in a serving General Packet Radio Service support node (SGSN) in the source network after a handover is confirmed may be tunneled directly to an SGSN in the target network.

TS 43.129 version 6.6.0 introduces a packet switched handover in order to support real-time packet-switched handover with strict Quality of Service (QoS) requirements on low latency and packet loss. Packet switched handover reduces the service interruption of the user plane information at cell change compared to the cell-reselection and enables methods to improve buffer handling of user plane data in order to reduce packet loss at cell-change.

The scope of TS 43.129 version 6.6.0 is handovers to/from GERAN (GSM/EDGE Radio Access Network) A/Gb mode. More specifically, a serving GPRS support node (SGSN) user plane and control plane is available in both source and target systems. In accordance with this standard lossless packet switched handover PDUs are forwarded from the SGSN in the source system to the SGSN in the target system using a Gn interface.

However, certain access networks may be arranged differently such that they do not employ an SGSN or equivalent entity in the user plane. For instance, in the proposed 3GPP long term evolution (LTE) access scheme, disclosed in 3GPP technical report TR 23.882, version 0.8.1 (2005-11) there are only two user plane elements: an evolved Node B (eNB) and an access Gateway (aGW). 3GPP LTE is a packet-switched only access scheme. When compared to e.g. to the above described examples of third generation systems this means that a radio network controller (RNC) and SGSN user-planes are not used for 3GPP LTE access.

It might therefore be advantageous to have a mechanism which permits intersystem handover to take place in particular in communication systems where the handover may occur between different access systems, such as those described above where one of the networks is a 3GPP LTE access network and one of the networks is a "legacy" 3GPP access network. In this example "legacy" refers to 2G, 2.5G, 3G and 3.5G access networks. It might also be advantageous if packet loss and its associated problems could be avoided during a handover procedure. Embodiments of the present invention aim to address one or more of these problems.

SUMMARY

According to one embodiment, there is provided a node for a communication system. The node is configured to communicate with a mobile node via a first connection and to communicate with a third node via a first forwarding path. The node is configured to, following initiation of a handover procedure for handover of the first connection to a second connection between the mobile node and a target network node, transmit data to the third node for transmission to the target network node via a second forwarding path.

The node may comprise a base station of an origination access system or a controller of an origination access system.

According to another embodiment, there is provided a node for a communication system, which is configured to communicate with a source network node via a first forwarding path, the source network node being configured to communicate with a mobile node via a first connection. The node is further configured to, following initiation of a handover procedure for handover of the first connection to a second connection between the mobile node and a target node, communicate with the target network node via a second forwarding path, the target network node being configured to communicate with the mobile node by a second connection, receive data from the source network node, and transmit the data to the target network node via the second forwarding path.

According to another embodiment, there is provided a method in a node for a communication system. The comprises communicating with a mobile node via a first connection, communicating with a third node via a first forwarding path, and following initiation of a handover procedure for handover of the first connection to a second connection between the mobile node and a target network node, communicating data to the third node for communication to the target network node via a second forwarding path.

According to yet another embodiment, there is provided a method in a node for a communication system, the method comprising communicating with a source network node via a first forwarding path, the source network node being in communication with a mobile node via a first connection, following initiation of a handover procedure for handover of the first connection to a second connection between the mobile node and a target node, communicating with the target network node via a second forwarding path, receiving data from the source network node, and communicating the data to the target network node via the second forwarding path to be communicated to the mobile node by the second connection.

The methods may be provided by means of a computer program comprising program code means adapted to perform the methods.

The source network may be a system that the mobile node (or user equipment, UE) is using before handover. If the source network is a 2G or 3G access network then the source network node may represent the 2G or 3G SGSN. If the source network is a 3GPP LTE access network then the source network node may represent the eNB (LTE Node B). The third node may be an inter access system mobility anchor (I-ASA).

The data may be packet data and the first and second connections may each be packet switched connections. The data may be user plane data and the first and second forwarding paths may be user plane forwarding paths.

The data which is transmitted from the source network node to the third node may comprise downlink data (i.e. data which is intended for delivery to the mobile node). The method may further comprise delivering the data from the target network node to the mobile node via the second connection.

The first forwarding path may comprise a first data tunnel and the second forwarding path may comprise a second data tunnel. These data tunnels may be independent. Thus, in an embodiment, the source network node may encapsulate data and send it via a first tunnel to the third node, where the first tunnel terminates. The third node may then decapsulate (de-tunnel) the received tunnel packets. The third node may then encapsulate the packets and send them via a second tunnel to the target network node. This may be provided to avoid the need for complex security associations between source and target network nodes.

In accordance with a specific embodiment, a method is provide wherein a source network node redirects a data tunnel, running between the source network node and an inter access system mobility anchor, to run instead between the inter access system mobility anchor and a node in the target network, the source network node tunnels protocol data units back to the inter access system mobility anchor (including re-assembly of unacknowledged segments, if any), the inter access system mobility anchor de-tunnels the received tunnel packets, and the packets are tunneled to the target network node.

Embodiments of the present invention may advantageously allow lossless inter 3GPP access system mobility, especially when one of the access networks does not employ an SGSN or equivalent entity (e.g. a eGSN-c in a 3GPP LTE network) in a user plane. According to certain embodiments packet loss during intersystem handover may be avoided. Thus unnecessary congestion control recovery procedures, such as Transport Control Protocol (TCP) congestion control recovery procedures, which reduce the effective throughput, can also be avoided. A further benefit may be provided in view of throughput degradation since certain embodiments may assist in avoidance of ping-pong effects between access systems when a mobile node is located at a cell edge.

BRIEF DESCRIPTION OF DRAWINGS

For better understanding of the embodiments of the present invention, reference will now be made by way of example to the accompanying drawings in which.

DESCRIPTION OF EXEMPLIFYING EMBODIMENTS

Figure 1:
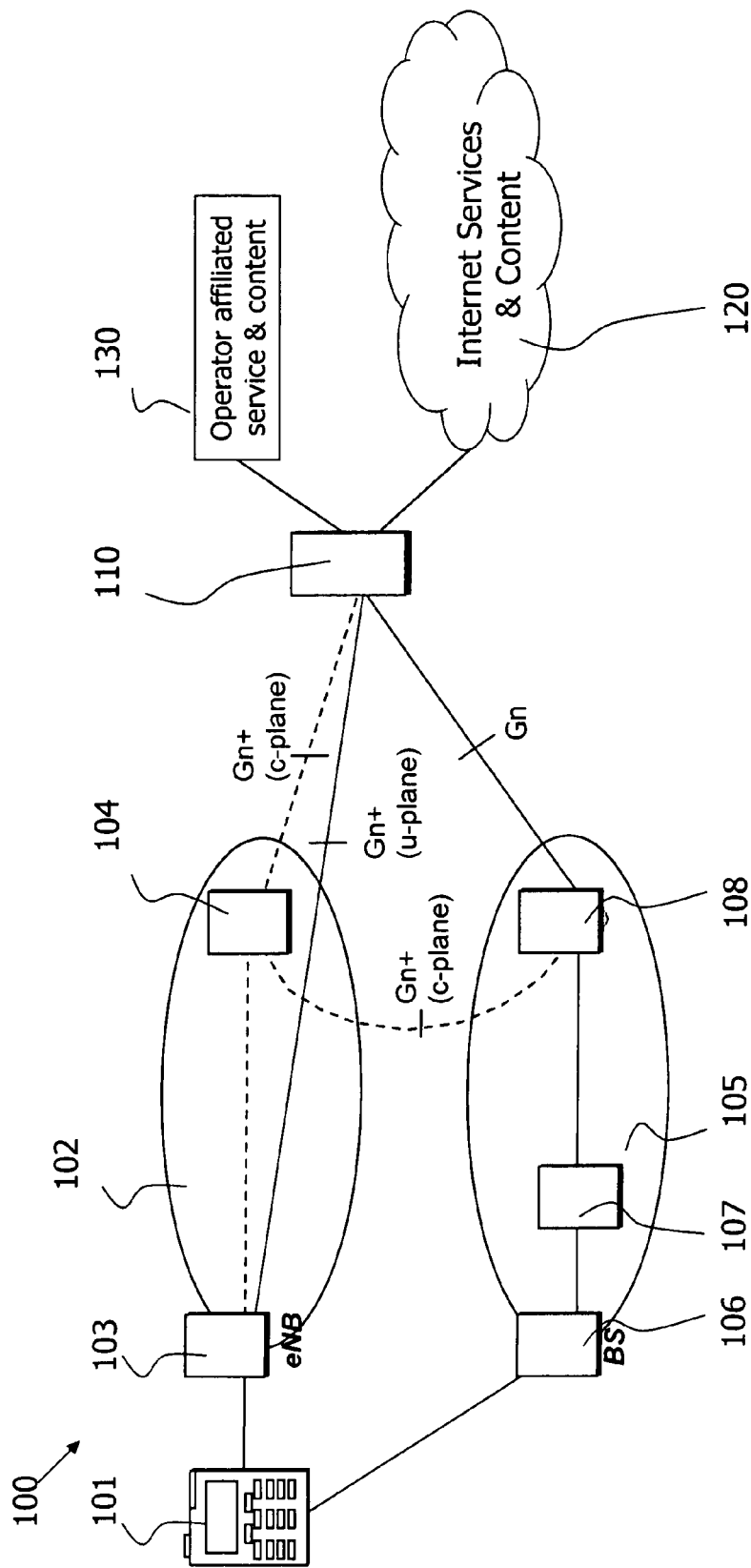
FIG. 1 shows a communication system in which the exemplifying embodiments of the present invention may be implemented.

Reference is made to FIG. 1 which illustrates an example of a context in which the present invention may be used, i.e. a cellular telecommunication system 100 providing a packet switched service for mobile nodes 101. A mobile node 101 may access services provided by a data network 120, for example the Internet and/or at least one network operator 130. The communications system may comprise a 3GPP long term evolution (LTE) access network 102 and a 2G/3G access network 105, e.g. a 3G Universal Mobile Telecommunications System (UMTS) network.

In a mobile communication system the mobile node 101, for example a mobile station (MS), is enabled to communicate with a base (transceiver) station (BS) 106 of the 2G/3G access network 105 and/or with an evolved node B (eNB) 103, i.e. the base station of the LTE access system, in respective wireless connections. Each base station has a radio transceiver capable of transmitting radio signals in downlink (DL) to the mobile stations within the access area and receiving radio signals in uplink (UL) from the access area next to the base station. By means of these signals the base station can communicate with the mobile station (MS), which itself includes a radio transceiver.

Although the base stations of a 3G UMTS network may also be called node B, the term base station (BS) is used herein, for clarity reasons, for the base stations 106 in the 2G/3G access network 105, to distinguish them from the eNB elements 103 in the 3GPP LTE network 102. Regardless the used terminology, both nodes are configured to provide wireless access for the mobile node 101.

The mobile stations may have a connection either to the base station 106 or to the eNB 103. It should be appreciated that the functions of the base station 106 and the eNB 103 may also be implemented by means of one entity, i.e. that a base transceiver station may serve both the 2G/3G system and the 3GPP LTE system.

Data to be transmitted from and to mobile stations, may be speech data, video data or other data. Any packet data transmission may be encoded into a form suitable for transmission at a bit rate which is dependent on the application and the source of the data.

A base station or eNB may be connected to further nodes of the network, for example controller node or a mobility management entity (MME) such as a serving GPRS support node (SGSN) 108 or an evolved SGSN 104 that is configured to provide control plane function only (e-GSN-c). Thus, during a connection, a mobile station (MS) 109 is connected to a controller node via the base station 106 or the eNB 103. Non-limiting examples of further (controller) nodes in the 2G/3G access network include a 2G base station controller (BSC) and a 3G radio network controller (RNC) 107. It should be appreciated that other control nodes may also be used for the implementation of the network control function.

In the shown 3GPP LTE network 102 the eNB 103 is connected to a controller entity, i.e. the evolved SGSN (eGSN-c) 104. The eGSN-c 104 operates in the control plane only, and thus does not provide user plane functions. The eNB 103 has a user plane connection to an anchor entity configured to provide inter-access system mobility 110. This entity will be referred to below as an inter-access system anchor point (I-ASA). The SGSN 108 of the 2G/3G access network 105 is also connected to the inter-access system mobility anchor 110. The inter-access system mobility anchor 110 may perform or support handover between different access systems. The inter-access system mobility anchor 110 communicates with the SGSN 108 and the eNB 103 via an appropriate interface, for example a Gn interface. The anchor entity 110 may be located on the communication path between the mobile 101 and the data network 120 and/or operator service providing systems 130.

The mobile node 101 may be provided by a user equipment such as a dual-mode or multi-mode mobile station that is configured to be suitable for communication via the base station 106 of the 2G/3G access system 105 and the eNB 103 of the access system 102. Typically a mobile station can move within an access area and also between different access areas, and thus can provide mobility for the users thereof. For example, the mobile station may be a hand portable transceiver or "mobile phone". The location of a mobile station may even be fixed, either temporarily or permanently, for example if it is providing radio communications for a fixed site.

When the mobile station is moveable it may move between access areas such as cells of a cellular radio system. Therefore, as it moves from one cell (the "old cell") to another cell (the "new cell") there is a need to hand it over from communication with the base station and associated network apparatus of the old cell to the base station and associated network apparatus of the new cell without dropping the call. However, it should be appreciated that there may be various other reasons than roaming for the handover, such as overload situations and high priority calls forcing a handover of earlier connections.

The packet data service may be a connectionless service where information symbols are transmitted within data packets. The size and length of the data packets may vary. The information symbols are typically carried by means of packet data bearers. The transmission speed of a bearer is defined by a parameter referred to as bitrate. More particularly, bitrate defines the bit rate that has been allocated for a user of the packet data services. Packet data traffic may include various kinds of data transmission, such as voice over Internet Protocol (VoIP), short messages or text only emails and transmission of large documents in the background and interactive browsing of the world wide web (WWW).

A dual-or multi-mode mobile station may consist of a mobile equipment (ME), and one or more subscriber identity modules (SIMs). The mobile equipment is commonly understood to refer to the radio terminal used for radio communication over the interface between the mobile station and the base station and over the interface between the mobile station and the eNB. The SIM is typically a smart card that holds the subscriber identity, performs authentication algorithms, and stores authentication and encryption keys and some subscription information that is needed at the terminal. These SIM functions may be implemented by one or two cards, depending on the application.

Figure 2:
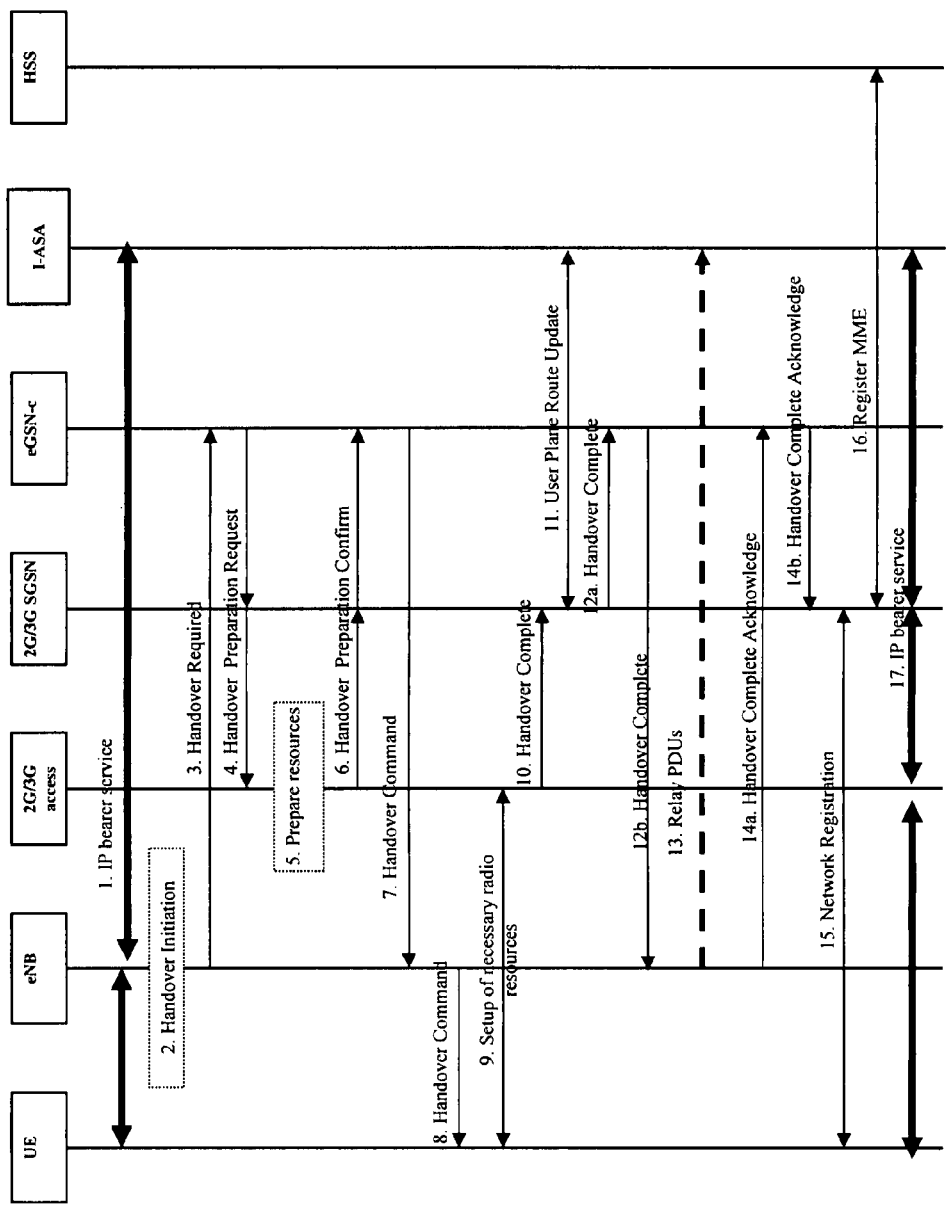
FIG. 2 shows a signaling diagram for a lossless LTE to 2G/3G intersystem handover.

The following describes with reference to FIG. 2 an example of a procedure enabling handover from the eNB 103 of the exemplifying 3GPP LTE network 102 to the SGSN 108 of the exemplifying 2G/3G access network 105 of FIG. 1.

Before the handover is initiated (1), the packet flow to-/from- the mobile node/user equipment (UE) traverses the inter-access system mobility anchor (I-ASA) and the eNB. At (2), based on e.g. signal quality measurements the eNB determines that an inter-system handover needs to be initiated. At (3) to (6), eNB starts the handover procedure by triggering a preparation phase. During this phase the target radio access network is identified and resources in this target access network are prepared.

After receiving notification that the resources in the target system have been reserved (in message 6), the controller node of the origination system (eGSN-c) can issue a handover command message (7) to the eNB. At (8), the eNB sends the handover command to the user equipment (UE). At this point the user equipment (UE) can disconnect from the eNB.

The user equipment (UE) then attaches to the target access system (in this case 2G/3G) by setup of the necessary radio resources (9). Once the user equipment is attached and the resources are ready the controller node of the second system (SGSN) is informed that the handover was successful (10).

The SGSN can now inform the inter-access system mobility anchor (I-ASA) via message 11 that the user is reachable through the SGSN. This will typically mean that the user traffic is now tunneled from inter-access system mobility anchor (I-ASA) to the SGSN (instead of the eNB, as before the handover). In the meantime the source eNB is also informed via message 12 that the handover was successful.

Knowing that the handover was successful, the source eNB can now forward any buffered protocol data units (PDUs) back to the inter-access system mobility anchor (I-ASA). Due to the route update procedure in stage (11) these PDUs are now forwarded/tunneled to the user equipment through the access system where the user equipment now resides. The source eNB can then inform the SGSN that its role in the handover procedure is now over via messages 14a and 14b.

The user equipment (UE) may then perform a network registration procedure (15) with the controller of the new system, i.e. the 2G/3G SGSN in FIGS. 1 and 2. This may also include an authentication procedure. The location of the user equipment at a home subscriber server (HSS) can be updated via message 16. The handover procedure is now complete and the packet flow to and/or from the UE now traverses inter-access system mobility anchor (I-ASA), the 2G/3G SGSN and 2G/3G access system. In alternative embodiments, the SGSN may not necessarily always be on-path, i.e. packet flow after completion of the handover may not traverse the SGSN.

The scheme shown in FIG. 2 may avoid packet loss during the handover procedure. After message 7 is received the eNB can re-assemble any buffered frames (downlink data to be transmitted to the user equipment) that are not yet transmitted and treats them as if they were uplink (UL) protocol data units (PDUs). In other words, the eNB can tunnel (13) this data back to the inter-access system mobility anchor (I-ASA) as soon as the eNB receives an indication that the handover to the target system succeeded (message 12b). Since the inter-access system mobility anchor (I-ASA) tunnel for the user equipment (UE) was redirected towards the target access system in message 11, these protocol data units (PDUs) are now tunnelled (forwarded) to the 2G/3G SGSN, and further processed to be received by the user equipment. (UE) over the target access system.

Figure 3:
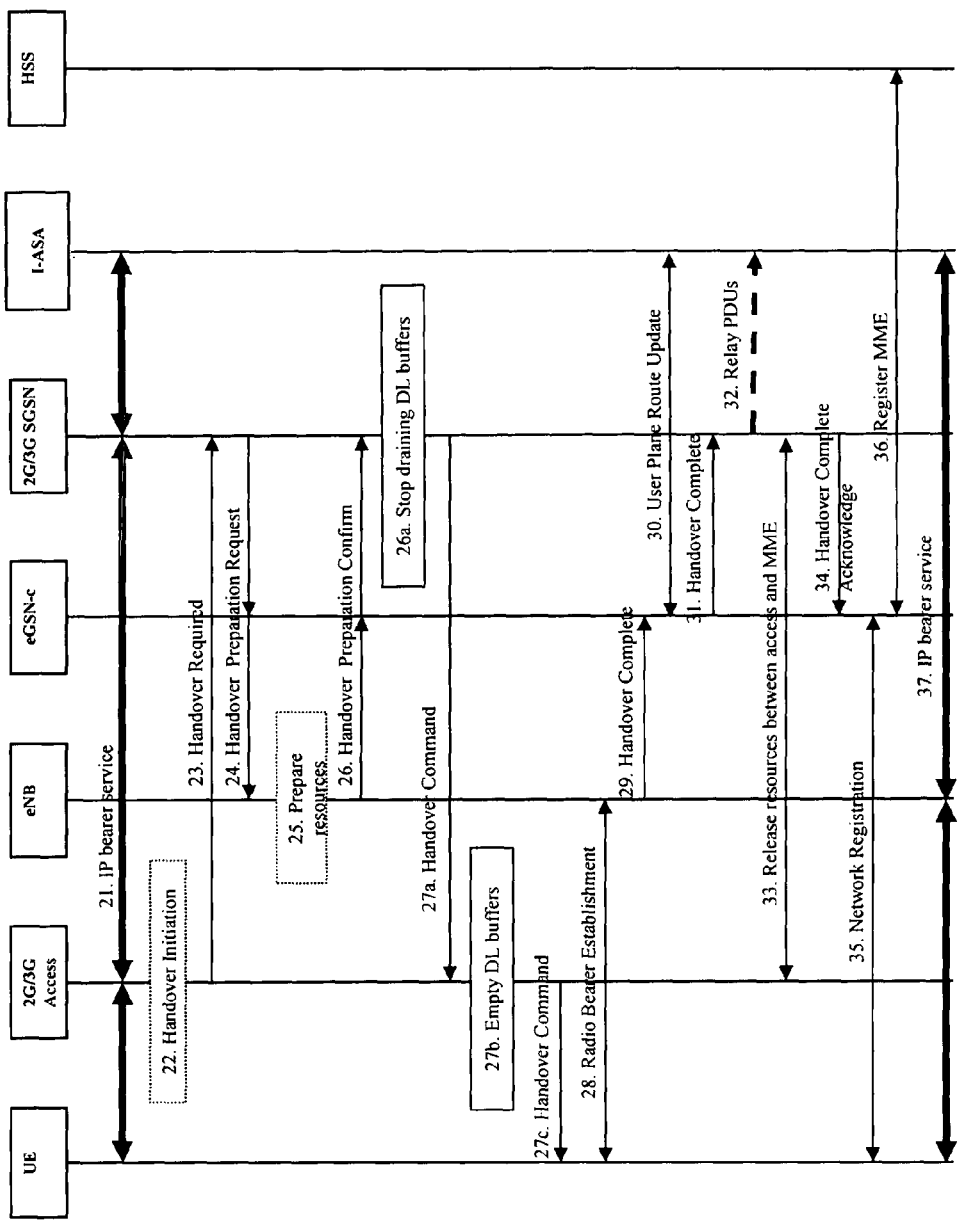
FIG. 3 shows a signaling diagram for a lossless 2G/3G to LTE intersystem handover.

FIG. 3 shows a possible sequence of events in the reverse direction, i.e. from a 2G/3G access network 105 of FIG. 1 to 3GPP LTE network 102 handover.

At (21), before the handover is initiated, a packet flow to and/or from the user equipment (UE) traverses the inter-access system mobility anchor (I-ASA), the 2G/3G SGSN and the 2G/3G access network. The SGSN may not necessarily always be on-path. At (22), based on e.g. signal quality measurements, the 2G/3G access determines that an inter-system handover needs to be initiated.

At (23) to (26), the 2G/3G access network starts the handover procedure by triggering a preparation phase. During this phase the target radio access network is identified and resources in this target access network are prepared. In step 26a(i.e. after receiving message 26) the source 2G/3G SGSN stops draining downlink buffers. Any incoming protocol data units (PDUs) for this specific users are further buffered.

The source 2G/3G SGSN can then issue a handover command (27a) towards the source 2G/3G access node, for example a radio network controller (RNC) or a base station controller (BSC). The source 2G/3G access node can then attempt to empty all buffers (27b) corresponding to this user before issuing the handover command in (27c). This can be provided to simplify the handover procedure since it avoids the need to reconstruct protocol data units from radio frames and forwarding of these protocol data units from the 2G/3G access system to the target access system.

The user equipment (UE) may then attach to the target access system at step 28. The target eNB informs the eGSN-c controller entity that the user equipment (UE) has moved to the access system via message 29. The eGSN-c controller entity may then inform the inter-access system mobility anchor (I-ASA) that the user is reachable through the eNB by means of an update message at (30).

As soon as the route is updated at (30), the eGSN-c controller entity may inform the source 2G/3G SGSN entity that the handover was successful via message 31. The source 2G/3G SGSN entity can now relay via tunnel 32 any PDUs buffered since step 26a back to the inter-access system mobility anchor (I-ASA). Due to the update at (30), these PDUs are now received by the user equipment (UE) through the target eNB rather than the original base station.

At (33), the source 2G/3G SGSN entity may then release network resources associated with this user. The source 2G/3G SGSN entity informs the eGSN-c controller entity that its role in the handover procedure is over via message 34. The user equipment (UE) can then perform a network registration procedure with the eGSN-c controller entity at (35).

The location of the user equipment (UE) at a home subscriber server (HSS) cam be updated by means of registration at (36). At (37), the handover procedure is completed and the packet flow to and/or from the user equipment (UE) now traverses the inter-access system mobility anchor (I-ASA) and the eNB.

In the 2G/3G access network to 3GPP LTE network handover discussed above, the procedure to avoid packet loss starts as soon as the 2G/3G SGSN entity receives message 26. At this point the SGSN entity stops sending DL PDUs for this specific user equipment (UE) (26a) and issues the handover command (27a). The 2G/3G access empties the DL buffers for this user equipment (UE) before commanding the user equipment (UE) to move to the target system (27c). The I-ASA tunnel is redirected so that it terminates at the eNB in message 30. In the meantime the source 2G/3G SGSN buffers any incoming PDUs which are then relayed back to the I-ASA in 32. Due to 30, these PDUs are now forwarded to the user equipment (UE) through eNB.

Figure 4:
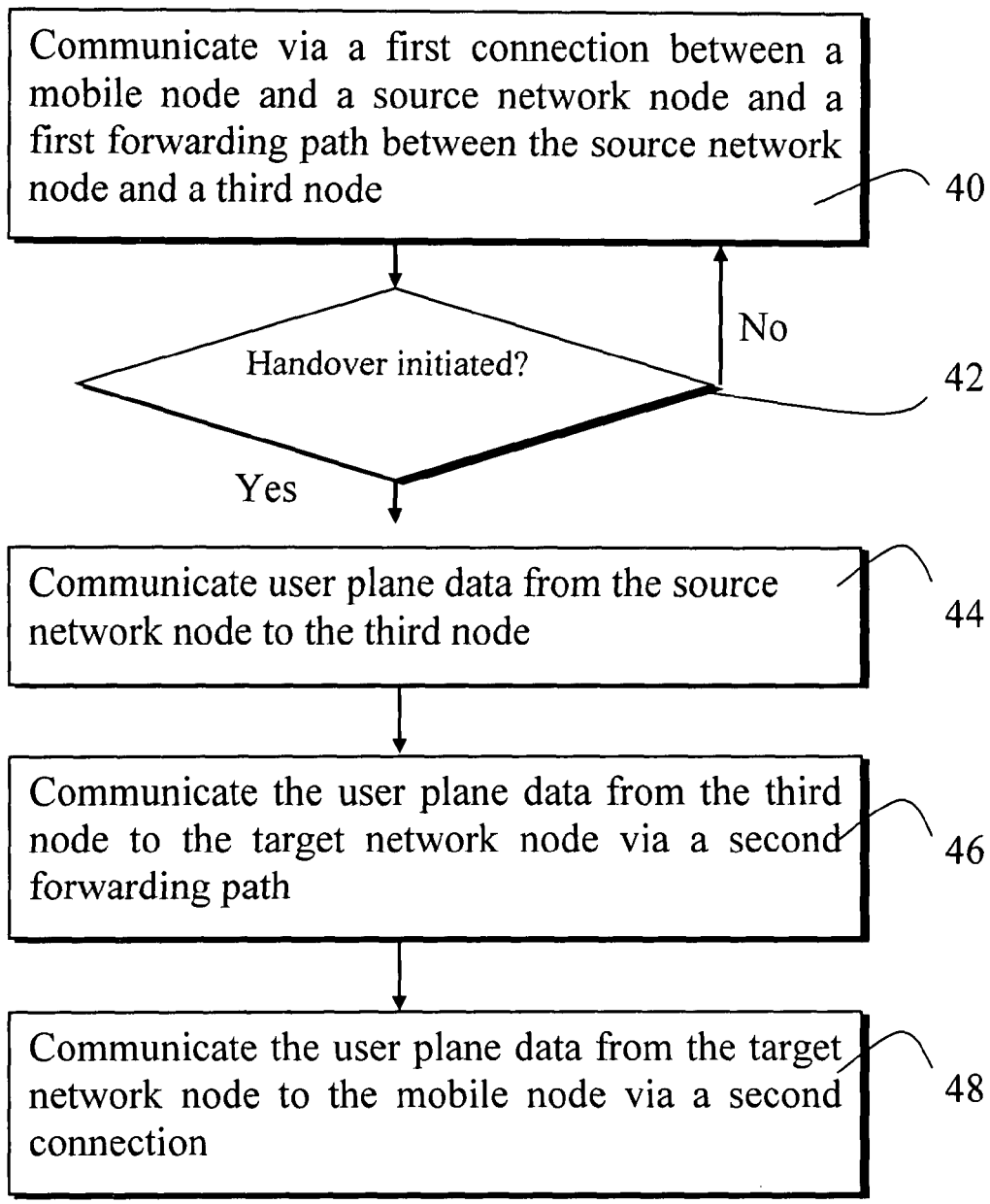
FIG. 4 shows a flowchart in accordance with an embodiment.

FIG. 4 shows an exemplifying flowchart in accordance with an embodiment. At 40 a source network node, for example the eNB 103 of FIG. 1, communicates with a mobile node 101 via a first connection and with a third node, for example the anchor node 110, via a first forwarding path. In response to detection at 42 that the first connection is to be handed over to a second connection between the mobile node and a target network node, the source network node transmits data from to the third node at 44. The data is received at the third node. Upon completion of the handover procedure the data is forwarded at 46 to the target network node via a second forwarding path. The target network node may then communicate to the mobile node at 48.

In certain embodiments downlink protocol data units sent to the source network controller node, for example for delivery to a mobile node, are tunneled to the inter-access system mobility anchor (I-ASA) instead of sending these directly to a corresponding controller node in the target network. This avoids packet loss during intersystem handover. This, in turn may assist in avoiding unnecessary TCP congestion control recovery procedures which may reduce the effective throughput. Embodiments may also allow packet loss mitigation. In certain embodiments throughput degradation may also be avoided when a user equipment (UE) is located at cell edge and possibly causing ping-pong effects between access systems.

A further advantage may be provided in that complex security associations between the two controller nodes (e.g. a 3GPP LTE eNBs and a 2G/3G SGSN) are not necessarily required, in contrast to the case where direct tunneling between these two nodes is used.

In accordance with an alternative embodiment a forwarding interface is included between a source station, for example a eNB and a controller of the target system, for example target SGSN. Yet another possibility is to use bi-casting at the inter-access system mobility anchor (I-ASA). Bi-casting can be used for seamless real time (RT) intersystem handover, although it may not be well suited for lossless intersystem handovers because in bi-casting, any PDUs queued in the source system are lost if they are not forwarded to the target system.

Some of the embodiments may be provided in 2G/3G access networks by modifying the handover procedure so that buffered packets are tunneled from the source network node to an inter-access system mobility anchor entity (I-ASA) rather than to a target network node.

The required data processing functions may be provided by means of one or more data processors. The data processing facility may be provided on an appropriate data processing platform, such as by a computer chip. The required data processing functions of a node may be provided by separate processors or by an integrated processor. For example, data processing may be provided in a central processing unit of a controller, or distributed across several data processing modules of an access system.

An appropriately adapted computer program code product or products may be used for implementing the embodiments, when loaded on an appropriate processor, for example in a processor of a node. The program code means may, for example, perform the generation and/or interpretation of messages, selection and/or determination of suitable actions to be taken and so forth. The program code product for providing the operation may be stored on and provided by means of a carrier medium such as a carrier disc, card or tape. A possibility is to download the program code product to the communication device via a data network.

It should be appreciated that whilst embodiments of the present invention have been described in relation to mobile nodes such as mobile stations, embodiments of the present invention are applicable to any other suitable type of user equipment.

The embodiments of the invention have discussed handover of a connection between user equipment and particular network nodes. Embodiments of the present invention may also be applicable to a handover between other network elements in certain cases.

It is also noted herein that while the above describes exemplifying embodiments of the invention, there are several variations and modifications which may be made to the disclosed solution without departing from the scope of the present invention as defined in the appended claims.

The invention claimed is:

1. A node comprising at least one processor configured to at least:
communicate with a mobile station via a first connection;
communicate with a third node via a first forwarding path between the node and the third node, the first forwarding path traversing a controller node and comprising a control plane for transmitting control information;

communicate with the third node over a user-plane connection directly between the third node and the node; and initiate a handover procedure for handover of the first connection to a second connection between the mobile station and a target base station;

transmit, in response to a handover complete message indicating that the handover procedure was successful, user-plane data buffered in the node and intended for the mobile station to the third node via the user-plane connection for subsequent transmission to the target base station via a second forwarding path between the target base station and the third node, the node comprising an evolved Node B base station.

2. The node as claimed in claim 1, comprising a base station of an origination access system, wherein the controller node operates in a control plane to the third node rather than in a user plane to the third node, the controller node interfacing a long term evolution network.

3. The node as claimed in claim 1, wherein the controller node is of an origination access system.

4. The node as claimed in claim 3, wherein the controller node comprises a serving General Packet Radio Service support node.

5. The node as claimed in claim 1, wherein the third node provides an anchor node for enabling inter access system mobility.

6. The node as claimed in claim 1, wherein the user-plane data is packet data and the first connection is a packet switched connection.

7. The node as claimed in claim 1, wherein the first forwarding path comprises a data tunnel.

8. A node comprising at least one processor configured to at least:

communicate with a source network node via a first forwarding path between the node and the source network node, the first forwarding path traversing a controller node and comprising a control plane for transmitting control information, the source network node communicating with a mobile station via a first connection;

communicate with the source network node over a user-plane connection directly between the node and the source network node;

receive, following initiation of a handover procedure for handover of the first connection to a second connection between the mobile station and a target base station, user-plane data buffered in the source network node and intended for the mobile station from the source network node via the user-plane connection; and transmit the user-plane data to the target base station via a second forwarding path between the node and the target base station.

9. The node as claimed in claim 8, wherein the node comprises an entity configured to provide inter access system mobility.

10. The node as claimed in claim 8, wherein the first connection is provided by the source network node of a first access system and the second connection is provided by the target base station of a second, different access system and wherein the node is configured to enable handover of the mobile station between the different access systems.

11. The node as claimed in claim 8, wherein the user-plane data is packet data and the first connection and the second connection are each packet switched connections.

12. The node as claimed in claim 8, wherein the first forwarding path comprises a first data tunnel and wherein the second forwarding path comprises a second data tunnel.

13. The node as claimed in claim 8, wherein the first and second forwarding paths are user plane forwarding paths.

14. The node as claimed in claim 8, wherein the node is located on the communication path between the mobile station and at least one other node.

15. A method comprising:

communicating, by a node, with a mobile station via a first connection;

communicating, by the node, with a third node via a first forwarding path between the third node, the first forwarding path traversing a controller node and comprising a control plane for transmitting control information;

communicating, by the node, with the third node over a user-plane connection directly between the third node and the node;

initiating, by the node, a handover procedure for handover of the first connection to a second connection between the mobile station and a target base station;

communicating, by the node and in response to a handover complete message indicating that the handover procedure was successful, user-plane data buffered in the node and intended for the mobile station to the third node via the user-plane connection for subsequent communication to the target base station via a second forwarding path between the target base station and the third node, the node comprising an evolved Node B base station.

16. The method as claimed in claim 15, further comprising:

sending, by the node, packet data on a tunneled packet switched connection to the third node.

17. A non-transitory computer readable medium comprising program code which when executed by a processor provide operations comprising:

communicating, by a node, with a mobile station via a first connection;

communicating, by the node, with a third node via a first forwarding path between the third node, the first forwarding path traversing a controller node and comprising a control plane for transmitting control information;

communicating, by the node, with the third node over a user-plane connection directly between the third node and the node;

initiating, by the node, a handover procedure for handover of the first connection to a second connection between the mobile station and a target base station;

communicating, by the node and in response to a handover complete message indicating that the handover procedure was successful, user-plane data buffered in the node and intended for the mobile station to the third node via the user-plane connection for subsequent communication to the target base station via a second forwarding path between the target base station and the third node, the node comprising an evolved Node B base station.

18. A method comprising:

communicating, by a node, with a source network node via a first forwarding path between the node and the source network node, the first forwarding path traversing a controller node and comprising a control plane for transmitting control information, the source network node communicating with a mobile station via a first connection;

communicate, by the node, with the source network node over a user-plane connection directly between the node and the source network node;

receiving, by the node and following initiation of a handover procedure for handover of the first connection to a second connection between the mobile station and a target base station, user-plane data buffered in the source network node and intended for the mobile station from the source network node; and communicating, by the node, the user-plane data to the target base station via a second forwarding path between the node and the target base station.

19. The method as claimed in claim 18, further comprising:
providing, by the node, inter access system mobility.

20. The method as claimed in claim 18, wherein packet data is communicated via the first and second connections.

21. The method as claimed in claim 18, further comprising:
receiving, by the node, the user-plane data from the source network node via a first data tunnel; and
sending, by the node, the data via a second data tunnel.

22. The method as claimed in claim 18, further comprising:
communicating, by the node, user-plane data on the first and second forwarding paths.

23. The method as claimed in claim 18, further comprising at least:
communicating, by the node, with at least one other node.

24. A non-transitory computer readable medium comprising program code which when executed by a processor provide operations comprising:
communicating, by a node, with a source network node via a first forwarding path between the node and the source network node, the first forwarding path traversing a controller node and comprising a control plane for transmitting control information, the source network node communicating with a mobile station via a first connection;

communicate, by the node, with the source network node over a user-plane connection directly between the node and the source network node;

receiving, by the node and following initiation of a handover procedure for handover of the first connection to a second connection between the mobile station and a target base station, user-plane data buffered in the source network node and intended for the mobile station from the source network node; and communicating, by the node, the user-plane data to the target base station via a second forwarding path between the node and the target base station.

25. A node for a communication system, the node comprising:
means for communication with a mobile station via a first connection;
means for communication with a third node via a first forwarding path between the node and the third node via receiving control information from a controller node in the first forwarding path;
means for communication with the third node over a third connection via transmitting user data to the third node, wherein the third connection does not pass through any intermediate nodes; and
means for transmitting, in response to a handover complete message indicating that a handover procedure was successful, first data buffered in the node and intended for the mobile station to the third node for transmission to a target base station via a second forwarding path between the third node and the target base station following initiation of the handover procedure for handover of the first connection to a second connection between the mobile station and the target base station, the node comprising an evolved Node B base station.

26. A node for a communication system, the node comprising:
means for communication with a source network node via a first forwarding path between the node and the source network node, the source network node communicating with a mobile station via a first connection;
means for communication with the source network node over a third connection via receiving user data from the source network node, wherein the third connection does not pass through any intermediate nodes;
means for communication with a target base station via a second forwarding path between the node and the target base station following initiation of a handover procedure for handover of the first connection to a second connection between the mobile station and the target base station;
mean for receiving first data buffered in the source network node and intended for the mobile station from the source network node; and
means for transmitting the first data to the target base station via the second forwarding path between the node and the target base station.

* * * * *